(12) United States Patent
Guo et al.

(10) Patent No.: US 11,145,868 B2
(45) Date of Patent: Oct. 12, 2021

(54) ELECTRODE PIECE, CELL AND ENERGY STORAGE DEVICE

(71) Applicant: Ningde Amperex Technology Limited, Fujian (CN)

(72) Inventors: Peipei Guo, Fujian (CN); Yi Zhao, Fujian (CN); Ping He, Fujian (CN); Yejun Peng, Fujian (CN); Wenqiang Cheng, Fujian (CN)

(73) Assignee: NINGDE AMPEREX TECHNOLOGY LIMITED, Fujian (CN)

(*) Notice: Subject to any disclaimer, the term of this patent is extended or adjusted under 35 U.S.C. 154(b) by 58 days.

(21) Appl. No.: 16/143,644

(22) Filed: Sep. 27, 2018

(65) Prior Publication Data

US 2019/0027758 A1    Jan. 24, 2019

Related U.S. Application Data

(63) Continuation of application No. PCT/CN2016/078660, filed on Apr. 7, 2016.

(51) Int. Cl.
*H01M 4/70* (2006.01)
*H01G 11/74* (2013.01)
(Continued)

(52) U.S. Cl.
CPC .............. *H01M 4/70* (2013.01); *H01G 11/28* (2013.01); *H01G 11/52* (2013.01); *H01G 11/70* (2013.01);
(Continued)

(58) Field of Classification Search
None
See application file for complete search history.

(56) References Cited

U.S. PATENT DOCUMENTS

| 6,106,975 A * | 8/2000 | Watanabe | H01M 2/26 429/121 |
| 2012/0028091 A1* | 2/2012 | Park | H01M 2/023 429/94 |
| 2015/0188123 A1* | 7/2015 | Mizuno | H01M 4/624 429/221 |

FOREIGN PATENT DOCUMENTS

| CN | 1531133 A | 9/2004 |
| CN | 2872606 Y | 2/2007 |

(Continued)

OTHER PUBLICATIONS

International Search Report of PCT Patent Application No. PCT/CN2016/078660 dated Jan. 12, 2017.
Office Action, CN201680083797.3, dated Oct. 28, 2020, 7 pgs.

*Primary Examiner* — Carmen V Lyles-Irving
(74) *Attorney, Agent, or Firm* — Morgan, Lewis & Bockius LLP (57) ABSTRACT

The invention provides an electrode piece, a cell and an energy storage device. The electrode piece is used to form the cell, comprising: a current collector; a diaphragm; and a groove. Among them, the current collector exposed at the bottom of the groove is a blank current collector, and the blank current collector is formed with a connecting portion; the connecting portion is cut out from the blank current collector as a part of the blank current collector and bent on the blank current collector along the width direction; and at least a portion of the connecting portion extends beyond the outer edge of the current collector in the width direction. The electrode piece of the invention can increase the energy density of the cell and the connection strength of the blank current collector of the electrode tab and the electrode piece, and reduce the production cost.

15 Claims, 6 Drawing Sheets

(51) Int. Cl.
*H01M 50/531* (2021.01)
*H01G 11/28* (2013.01)
*H01G 11/52* (2013.01)
*H01G 11/70* (2013.01)
H01M 10/058 (2010.01)
H01M 10/0525 (2010.01)
H01M 10/054 (2010.01)

(52) U.S. Cl.
CPC .......... *H01G 11/74* (2013.01); *H01M 50/531* (2021.01); *H01M 10/054* (2013.01); *H01M 10/058* (2013.01); *H01M 10/0525* (2013.01)

(56) References Cited

FOREIGN PATENT DOCUMENTS

| | | | |
|---|---|---|---|
| CN | 1953243 | A | 4/2007 |
| CN | 104604002 | A | 5/2015 |
| CN | 105390657 | A | 3/2016 |
| JP | 2011014493 | A | 1/2011 |

\* cited by examiner

ELECTRODE PIECE, CELL AND ENERGY STORAGE DEVICE

CROSS-REFERENCE TO RELATED APPLICATIONS

This application is a continuation application of PCT application No. PCT/CN2016/078660 filed on Apr. 7, 2016, the contents of which are incorporated herein by reference in their entirety.

FIELD OF THE INVENTION

The present invention relates to the field of battery, in particular, to an electrode piece, cell and energy storage device.

BACKGROUND OF THE INVENTION

Separate electrode tab need to be welded to the current collector of the electrode piece during the preparation process of cells of conventional lithium ion batteries, which is relatively high in production cost. At the same time, the separate electrode tabs form a superposition of thickness of the cell, so that the connection region of the electrode tab becomes the maximum thickness region of the cell, thereby resulting in the waste of the size space of the cell except for the connection region of electrode tab and resulting in the loss of energy density of the cell. In addition, when multi-layer electrode tabs of the cell are welded, there is a risk of cracking or breaking at the welding point of the electrode tabs.

SUMMARY OF THE INVENTION

In view of the problems presented in the background art, it is an object of the present invention to provide an electrode piece, a cell and an energy storage device, which can increase the energy density of the cell and the connection strength of the electrode tab and the electrode piece, and reduce the production cost.

In order to achieve the above object, in a first aspect, the present invention provides an electrode piece for forming the cell comprising: a current collector; a diaphragm arranged on the surface of the current collector; and a groove, the bottom of the groove being an exposed current collector and the peripheral sides of the groove being the diaphragm.

Among them, the current collector exposed at the bottom of the groove is a blank current collector, and the blank current collector is formed with a connecting portion; the connecting portion is cut out from the blank current collector as a part of the blank current collector and bent on the blank current collector along the width direction; and at least a portion of the connecting portion extends beyond the outer edge of the current collector in the width direction. A plurality of connecting portions of the electrode piece are fixed together to form an electrode tab of the cell; or the connecting portions of the plurality of the electrode pieces are fixed together to form an electrode tab of the cell.

In order to achieve the above object, in a second aspect, the present invention provides a cell comprising a positive electrode piece, a negative electrode piece and a separator spaced between the positive electrode piece and the negative electrode piece. Among them, the positive electrode piece is the electrode piece according to the first aspect of the present invention; and/or the negative electrode piece is the electrode piece according to the first aspect of the present invention.

In order to achieve the above object, in a third aspect, the present invention provides an energy storage device comprising the cell according to the second aspect of the present invention.

The beneficial effect of the invention is as below:

In the electrode piece, cell and energy storage device according to the present invention, the electrode tab of the cell is formed by a plurality of the connecting portions of the electrode piece or the connecting portions of the plurality of electrode pieces, and the connecting portions are formed by cutting and bending a blank current collector, so the superimposition of the thickness of the cell from the electrode tab is eliminated and the energy density of the cell is improved. At the same time, compared with the prior art, it is not necessary to manufacture a separate electrode tab, thereby reducing the production cost. In addition, since one end of the connecting portion is integrally connected with the blank current collector, the connection strength between the electrode tab and the blank current collector is effectively improved, and the risk of breakage at the connection of the electrode tab and the blank current collector is reduced.

Among those, the reference numerals are as follows:

1 electrode piece
11 current collector
111 blank current collector
1111 connecting portion
11111 bending portion
1111E outer edge of connecting portion
11E outer edge of current collector
12 diaphragm
13 groove
2 electrode tab
B cell
S first surface
W width direction

DETAILED DESCRIPTION OF THE PREFERRED EMBODIMENTS

The electrode piece, the cell and the energy storage device of the present invention will be described in detail below with reference to the accompanying drawings.

Firstly, the electrode piece according to the first aspect of the present invention will be described.

With reference to FIGS. 1 to 6, the electrode piece 1 according to the present invention is used to form the cell B comprising: a current collector 11; a diaphragm 12 arranged on the surface of the current collector 11; and a groove 13, the bottom of the groove being an exposed current collector 11 and the peripheral sides of the groove being the diaphragm 12.

Among them, the current collector 11 exposed at the bottom of the groove 13 is a blank current collector 111, and the blank current collector 111 is formed with a connecting portion 1111; the connecting portion 1111 is cut out from the blank current collector 111 as a part of the blank current collector 111 and bent on the blank current collector 111 along the width direction W; and at least a portion of the connecting portion 1111 extends beyond the outer edge 11E of the current collector in the width direction W. A plurality of the connecting portions 1111 of the electrode piece 1 are fixed together to form an electrode tab 2 of the cell B; or the connecting portions 1111 of the plurality of electrode pieces 1 are fixed together to form the electrode tab 2 of the cell B.

In the electrode piece 1 according to the present invention, the electrode tab 2 of the cell B is formed by a plurality of the connecting portions 1111 of one electrode piece 1 or the connecting portions 1111 of the plurality of the electrode pieces 1, and the connecting portions 1111 are formed by cutting and bending the blank current collector 111, so the superimposition of the thickness of the cell B from the electrode tab 2 is eliminated and the energy density of the cell B is improved. At the same time, compared with the prior art, it is not necessary to manufacture a separate electrode tab, thereby reducing the production cost. In addition, since one end of the connecting portion 1111 is integrally connected with the blank current collector 111, the connection strength between the electrode tab 2 and the blank current collector 111 is effectively improved, and the risk of breakage at the connection of the electrode tab 2 and the blank current collector 111 is reduced.

In an embodiment of the electrode piece 1 according to the present invention, a portion of the connecting portion 1111 in contact with the blank current collector 111 is fixedly connected to the blank current collector 111.

In an embodiment of the electrode piece 1 according to the present invention, a portion of the connecting portion 1111 in contact with the blank current collector 111 is fixed to the blank current collector 111 by bonding.

Figure 1:
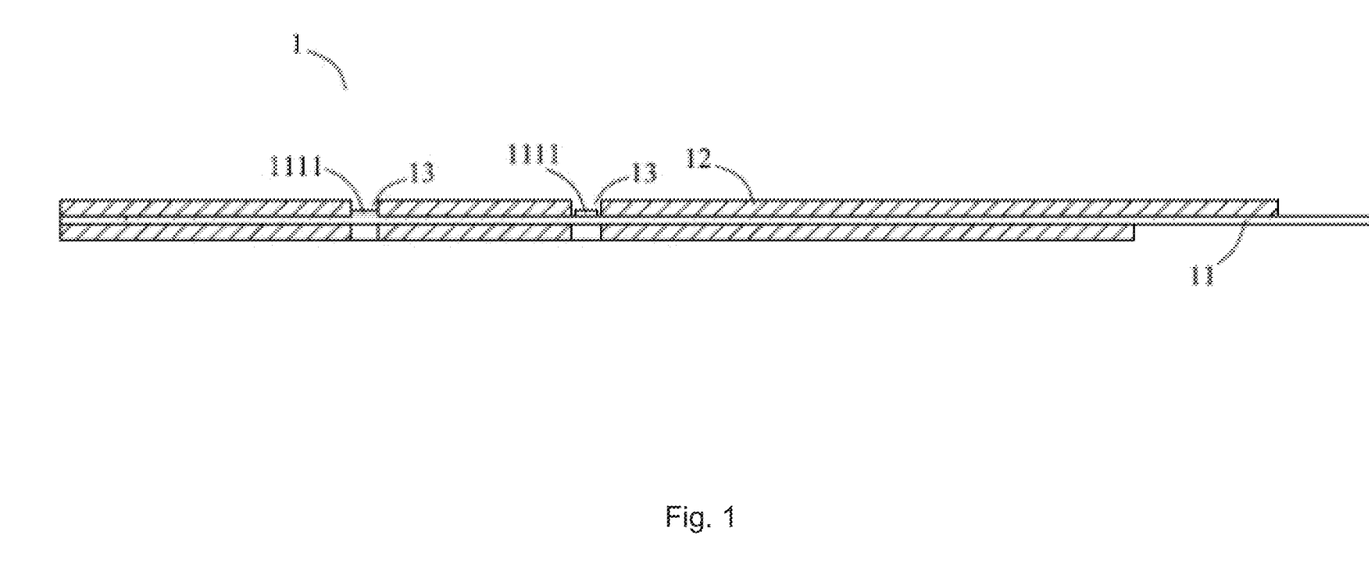
FIG. 1 is a front view of an embodiment of an electrode piece according to the present invention.
Figure 2:
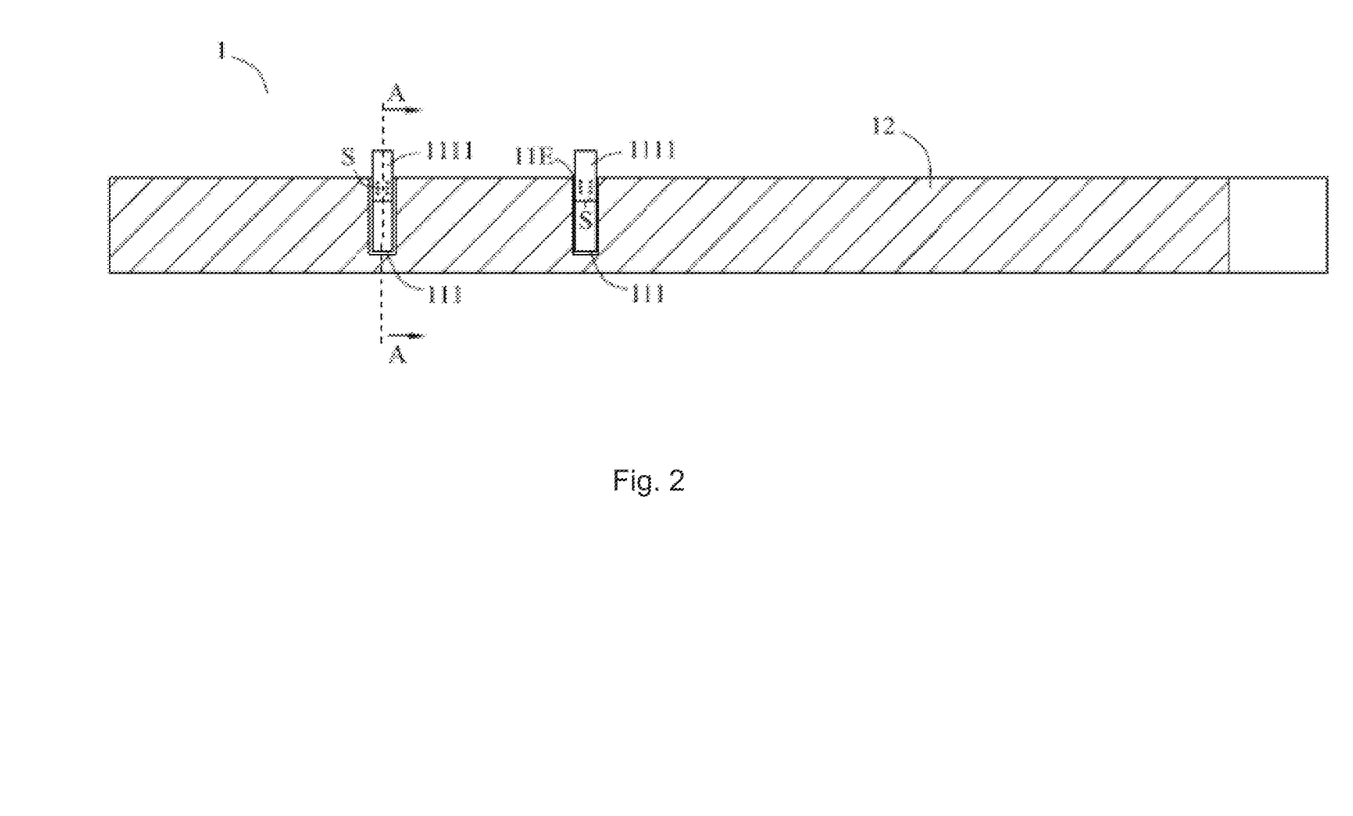
FIG. 2 is a top view of FIG. 1.
Figure 3:
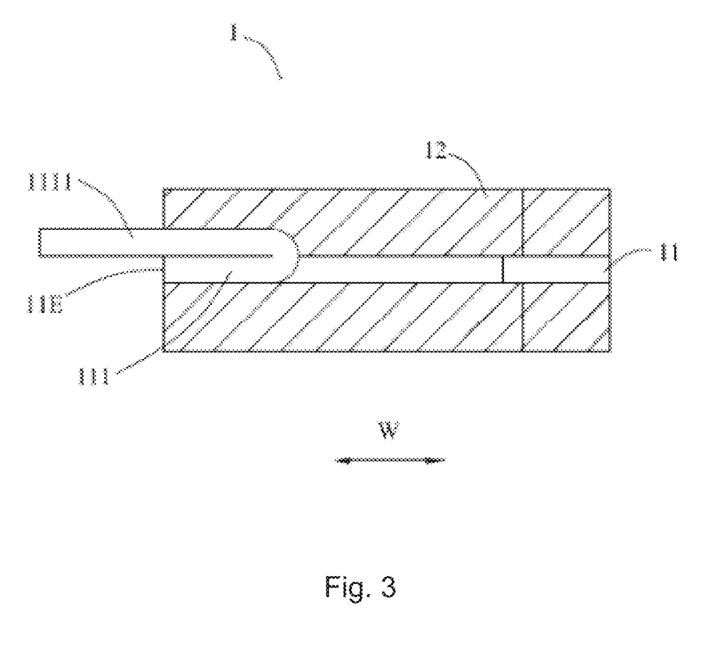
FIG. 3 is a cross-sectional view taken along line A-A of FIG. 2.

In an embodiment of the electrode piece 1 according to the present invention, with reference to FIG. 2, a portion of the connecting portion 1111 in contact with the blank current collector 111 is fixed to the blank current collector 111 by welding; at the welding point of the connecting portion 1111 and the blank current collector 111, the weld on the first surface S of the connecting portion 1111 is affixed with an adhesive tape. Specifically, since the connecting portion 1111 is fixed to the blank current collector 111 by welding and the welding head with dense welding points of the welding device is opposite to the first surface S of the connecting portion 1111, the roughness of the first surface S1 may be high after the welding is completed and it is necessary to stick the adhesive tape on the first surface S1.

In an embodiment of the electrode piece 1 according to the present invention, the welding is brazing, ultrasonic welding or resistance welding.

Figure 4:
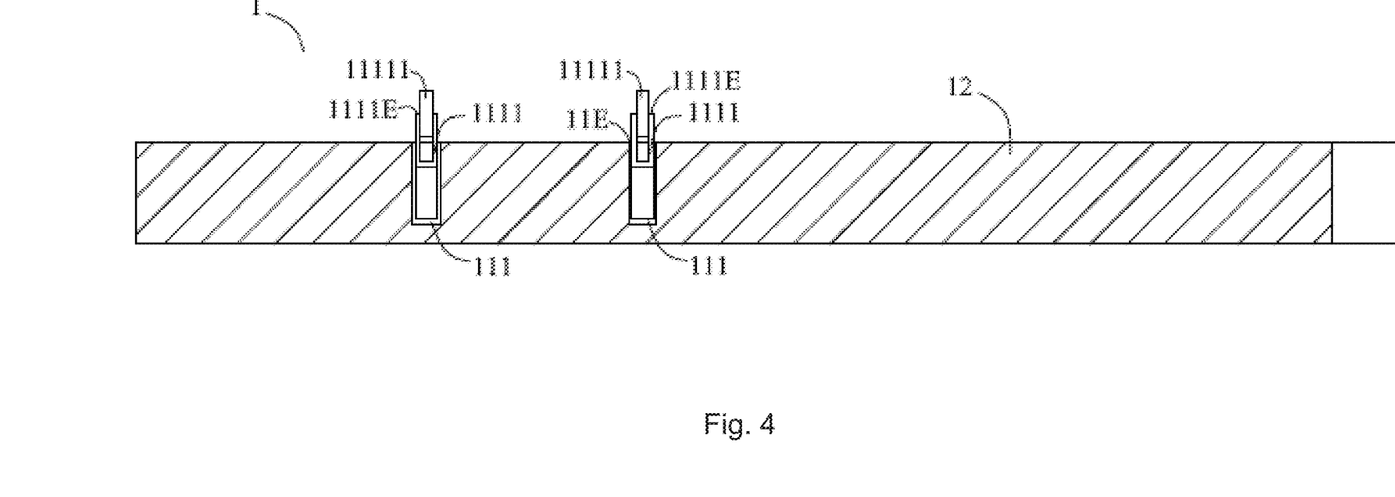
FIG. 4 is a front view of another embodiment of an electrode piece according to the present invention.
Figure 5:
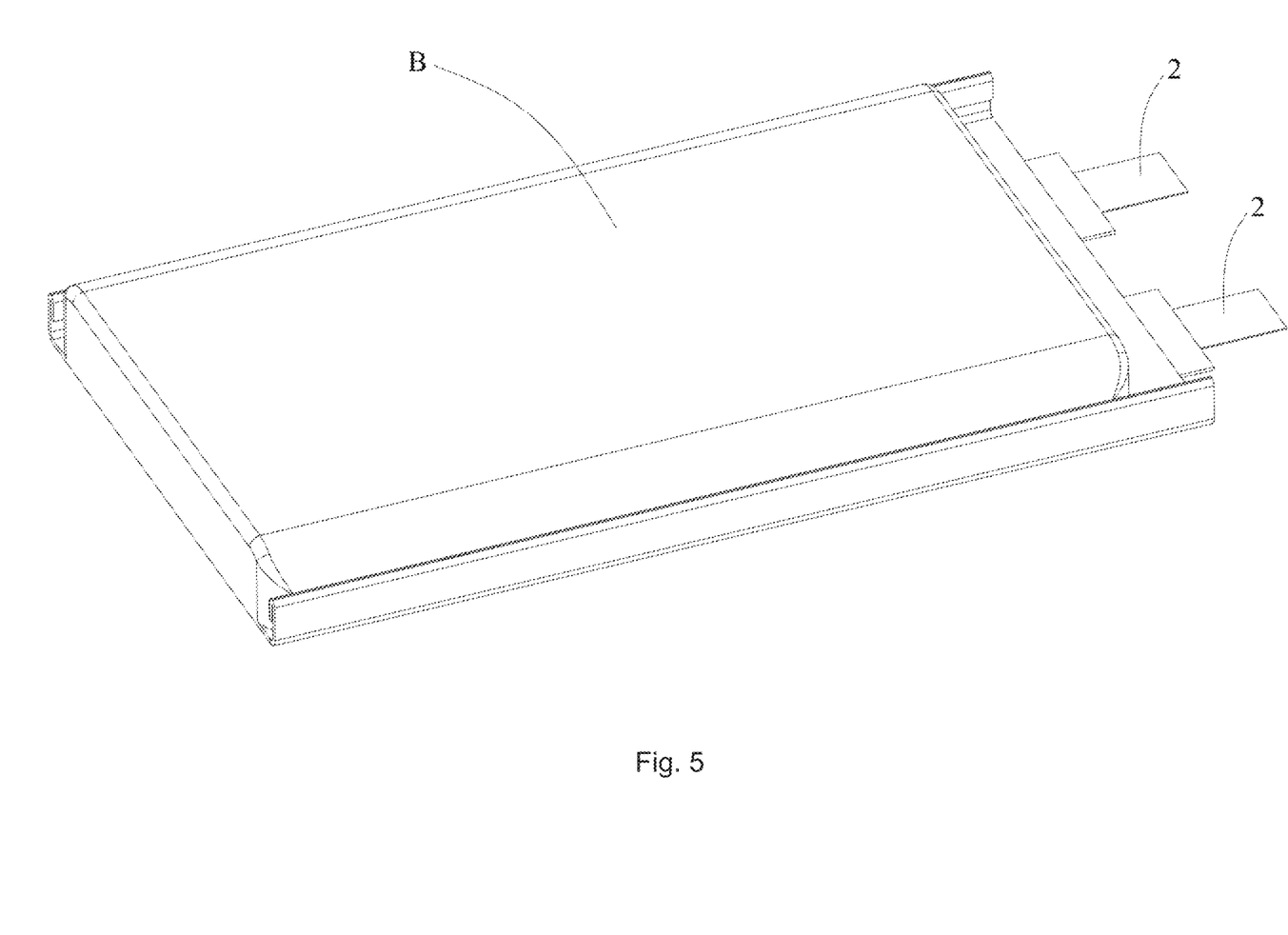
FIG. 5 is a perspective view of a cell according to the present invention.
Figure 6:
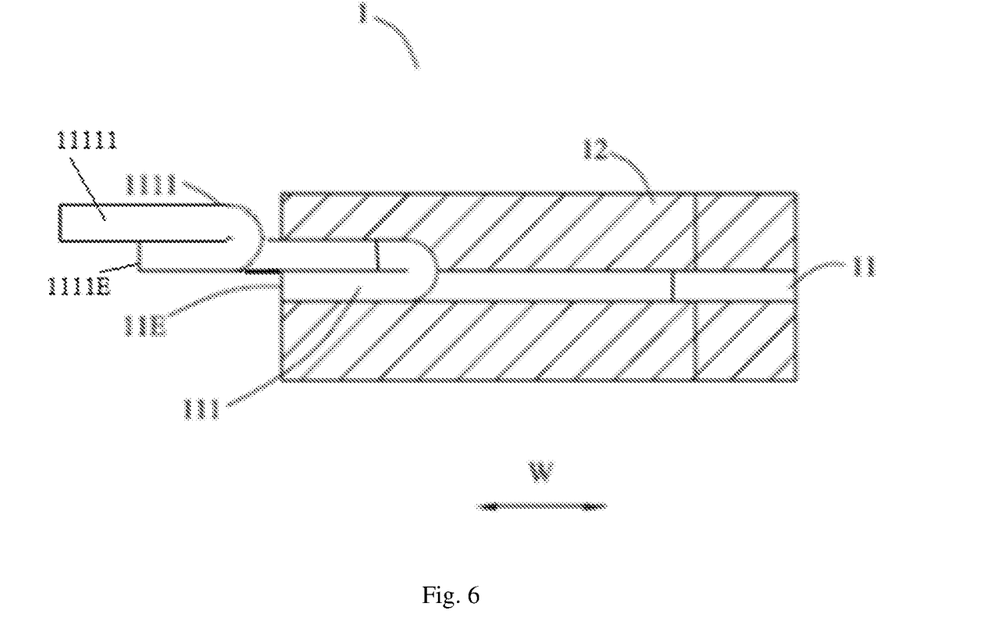
FIG. 6 is a top view taken along line B-B of FIG. 4.

In an embodiment of the electrode piece 1 according to the present invention, with reference to FIG. 4, each of the connecting portions 1111 is formed with a bending portion 11111; the bending portion 11111 is cut out from the connecting portion 1111 as a part of the connecting portion 1111 and bent on the connecting portion 1111 along the width direction W, and at least a portion of the bending portion 11111 extends beyond the outer edge 1111E of the connecting portion in the width direction W. Correspondingly, the bending portion 11111 of a plurality of connecting portions 1111 of the electrode piece 1 are fixed together to form the electrode tab 2 of the cell B; or the bending portion 11111 of the connecting portions 1111 of the plurality of the electrode pieces 1 are fixed together to form the electrode tab 2 of the cell B.

In the electrode piece 1 according to the present invention, the bending portion 11111 may extend the length of the extension of the corresponding connecting portion 1111 to facilitate the connection of the electrode tab 2 to the post (not shown) of the cell B.

Secondly, the cell according to the second aspect of the present invention will be described.

With reference to FIGS. 1 to 5, the cell B according to the present invention comprises a positive electrode piece, a negative electrode piece and a separator spaced between the positive electrode piece and the negative electrode piece. Among them, the positive electrode piece is the electrode piece 1 according to the first aspect of the present invention (correspondingly, the current collector 11 is a positive current collector, and the diaphragm 12 is a positive active material layer); and/or the negative electrode is the electrode piece 1 according to the first aspect of the present invention (correspondingly, the current collector 11 is a negative current collector, and the diaphragm 12 is a negative active material layer).

In an embodiment of the cell B according to the present invention, the cell B is a wound cell, a laminated cell or a wound and laminated cell. One electrode piece 1 of the wound cell has a plurality of the connecting portions 1111, and the plurality of the connecting portions 1111 are fixed together to form the electrode tab 2 of the cell B; the laminated cell has the plurality of the electrode pieces 1, each electrode piece has the connecting portion 1111, and the connecting portions 1111 of the plurality of the electrode pieces 1 are fixed together to form the electrode tab 2 of the cell B.

Finally, the energy storage device according to the third aspect of the present invention will be described.

The energy storage device according to the present invention comprises the cell according to the second aspect of the present invention.

In an embodiment of the energy storage device according to the present invention, the energy storage device is a secondary battery or a capacitor.

In an embodiment of the energy storage device according to the present invention, the secondary battery is a lithium ion battery, a sodium ion battery, or a zinc ion battery.

What is claimed is:
1. An electrode piece for forming a cell, comprising:
a current collector;
a diaphragm arranged on the surface of the current collector; and
a groove, the bottom of the groove being an exposed portion of the current collector and the peripheral sides of the groove being the diaphragm;
wherein,
the exposed portion of the current collector at the bottom of the groove is a blank current collector, and the blank current collector is formed with a connecting portion; the connecting portion is cut out from the blank current collector as a part of the blank current collector and bent on the blank current collector along a width direction of the electrode piece; and a first portion of the connecting portion extends beyond an outer edge of the current collector in the width direction, wherein the groove is formed by the exposed portion of the current collector and two diaphragm sidewalls in the width direction, wherein a second section of the connecting portion disposed in the groove in the width direction is surrounded by the blank current collector and the two diaphragm sidewalls;

a plurality of the connecting portions of the electrode piece are fixed together to form an electrode tab of the cell; or the connecting portions of the plurality of the electrode pieces are fixed together to form the electrode tab of the cell, wherein the second portion of the connecting portion is in contact with the blank current collector and the second portion is fixedly connected to the blank current collector.

2. The electrode piece according to claim 1, wherein the second portion of the connecting portion in contact with the blank current collector is fixed to the blank current collector by bonding.

3. The electrode piece according to claim 1, wherein the second portion of the connecting portion in contact with the blank current collector is fixed to the blank current collector by welding.

4. The electrode piece according to claim 3, wherein the welding is brazing, ultrasonic welding or resistance welding.

5. The electrode piece according to claim 1, wherein each of the connecting portions is formed with a bending portion; the bending portion is cut out from the connecting portion as a part of the connecting portion and bent on the connecting portion along the width direction, and at least a portion of the bending portion extends beyond the outer edge of the connecting portion in the width direction;

the bending portion of a plurality of the connecting portions of the electrode piece are fixed together to form the electrode tab of the cell; or the bending portion of the connecting portions of the plurality of the electrode pieces are fixed together to form the electrode tab of the cell.

6. A cell, comprising:
an electrode piece, comprising:
a current collector;
a diaphragm arranged on the surface of the current collector; and
a groove, the bottom of the groove being an exposed portion of the current collector and the peripheral sides of the groove being the diaphragm;
wherein,
the exposed portion of the current collector at the bottom of the groove is a blank current collector, and the blank current collector is formed with a connecting portion; the connecting portion is cut out from the blank current collector as a part of the blank current collector and bent on the blank current collector along a width direction of the electrode piece; and a first portion of the connecting portion extends beyond an outer edge of the current collector in the width direction,
wherein the groove is formed by the exposed portion of the current collector and two diaphragm sidewalls in the width direction, wherein a second section of the connecting portion disposed in the groove in the width direction is surrounded by the blank current collector and the two diaphragm sidewalls;

a plurality of the connecting portions of the electrode piece are fixed together to form an electrode tab of the cell; or the connecting portions of the plurality of the electrode pieces are fixed together to form the electrode tab of the cell, wherein the second portion of the connecting portion is in contact with the blank current collector and the second portion is fixedly connected to the blank current collector.

7. The cell according to claim 6, wherein the cell is a wound cell, a laminated cell or a wound and laminated cell.

8. The cell according to claim 6, wherein the second portion of the connecting portion in contact with the blank current collector is fixed to the blank current collector by bonding.

9. The cell according to claim 6, wherein the second portion of the connecting portion in contact with the blank current collector is fixed to the blank current collector by welding.

10. The cell according to claim 9, wherein the welding is brazing, ultrasonic welding or resistance welding.

11. The cell according to claim 6, wherein each of the connecting portions is formed with a bending portion; the bending portion is cut out from the connecting portion as a part of the connecting portion and bent on the connecting portion along the width direction, and at least a portion of the bending portion extends beyond the outer edge of the connecting portion in the width direction;

the bending portion of a plurality of the connecting portions of the electrode piece are fixed together to form the electrode tab of the cell; or the bending portion of the connecting portions of the plurality of the electrode pieces are fixed together to form the electrode tab of the cell.

12. An energy storage device, comprising the cell according to claim 6.

13. The energy storage device according to claim 12, wherein the energy storage device is a secondary battery or a capacitor.

14. The energy storage device according to claim 13, wherein the secondary battery is a lithium ion battery, a sodium ion battery, or a zinc ion battery.

15. The energy storage device according to claim 12, wherein each of the connecting portions is formed with a bending portion; the bending portion is cut out from the connecting portion as a part of the connecting portion and bent on the connecting portion along the width direction, and at least a portion of the bending portion extends beyond the outer edge of the connecting portion in the width direction;

the bending portion of a plurality of the connecting portions of the electrode piece are fixed together to form the electrode tab of the cell; or the bending portion of the connecting portions of the plurality of the electrode pieces are fixed together to form the electrode tab of the cell.

\* \* \* \* \*